United States Patent [19]

Krasner et al.

[11] 4,241,411
[45] Dec. 23, 1980

[54] FFT PARALLEL PROCESSOR HAVING MUTUALLY CONNECTED, MULTIPLE IDENTICAL CARDS

[75] Inventors: Norman F. Krasner, Belmont; Barry M. Leiner, Sunnyvale, both of Calif.

[73] Assignee: Probe Systems, Incorporated, Sunnyvale, Calif.

[21] Appl. No.: 961,116

[22] Filed: Nov. 16, 1978

[51] Int. Cl.³ .......................................... G06F 15/332
[52] U.S. Cl. .......................................................... 364/726
[58] Field of Search ........................................ 364/726

[56] References Cited

U.S. PATENT DOCUMENTS

| 3,662,161 | 5/1972 | Bergland et al. | 364/726 |
| 4,092,723 | 5/1978 | Picquendar et al. | 364/726 |

OTHER PUBLICATIONS

Veenkant "A Serial Minded FFT", *IEEE Trans. on Audio & Electroacoustics*, vol. AU 20, No. 3, Aug. 1972, pp. 180–185.
Bergland "A Parallel Implementation of the Fast Fourier Transform Algorithm", *IEEE Trans. on Computers*, vol. C-21, No. 4, Apr. 1972, pp. 366–370.
Gold et al., "Parallelism in Fast Fourier Transform Hardware", *IEEE Trans. on Audio & Electroacoustics*, vol. AU-21, No. 1, Feb. 1973, pp. 5–16.

*Primary Examiner*—David H. Malzahn
*Attorney, Agent, or Firm*—Thomas Schneck

[57] ABSTRACT

A modular fast Fourier transform processor which employs identical processor cards, each of which has a butterfly, memory units which send and receive data to and from the butterfly and a pair of input ports and a pair of output ports. The cards are interconnected through these ports to execute a fast Fourier transform decomposition in accord with Singleton's algorithm. The speed and capacity of the processor may be increased in a gradual manner by employing more of the processor cards.

19 Claims, 9 Drawing Figures

Input Files (57):
- (61): 31, 30, — — — — —, 5, 4, 3, 2, 1, 0
- (63): 63, 62, — — — — —, 37, 36, 35, 34, 33, 32

Output Files (65):
- (67): 47, 15, — — — — —, 33, 1, 32, 0
- (69): 63, 34, — — — — —, 49, 17, 48, 16

Fig. 3b

Input Files:
- (71): 31, _, 5, 3, 1 / 63, _, 37, 35, 33
- (73): 30, _, 4, 2, 0 / 62, _, 36, 34, 32

Output Files:
- (75): 47, _, 34, 33, 32 / 63, _, 50, 49, 48
- (77): 15, _, 2, 1, 0 / 31, _, 18, 17, 16

ODD NUMBERED PASSES

| AU NO | INPUT FROM: | OUTPUT TO: |
|---|---|---|
| 1 | A1c, A1d, A1a, A1b | B1c, B2c, B1d, B2d |
| 2 | A2c, A2d, A2a, A2b | B3c, B4c, B3d, B4d |
| 3 | A3c, A3d, A3a, A3b | B1a, B2a, B1b, B2b |
| 4 | A4c, A4d, A4a, A4b | B3a, B4a, B3b, B4b |

EVEN NUMBERED PASSES

| AU NO | INPUT FROM: | OUTPUT TO: |
|---|---|---|
| 1 | B1c, B1d, B1a, B1b | A1c, A2c, A1d, A2d |
| 2 | B2c, B2d, B2a, B2b | A3c, A4c, A3d, A4d |
| 3 | B3c, B3d, B3a, B3b | A1a, A2a, A1b, A2b |
| 4 | B4c, B4d, B4a, B4b | A3a, A4a, A3b, A4b |

OUTPUTS FROM CARDS 1-16

Fig. 6a

OUTPUTS FROM CARDS 17-32

Fig. 6b

NOTE: EACH LINE REPRESENTS ONE COMPLEX WORD DATA TRANSFER PATH.

FFT PARALLEL PROCESSOR HAVING MUTUALLY CONNECTED, MULTIPLE IDENTICAL CARDS

BACKGROUND OF THE INVENTION

1. Field of the Invention.

The invention relates to computing apparatus and more particularly to a parallel-iterative processor architecture for calculating the fast Fourier transform (FFT), especially for performing transforms of large size arrays at high speeds.

2. Prior Art.

The FFT is an algorithm for computer calculation of complex Fourier series. A great number of physics and engineering problems which indicate a need for waveform analysis may be solved by directly observing the Fourier series of a portion of a waveform or by performing additional operations on this series. The FFT was developed to quickly compute the so-called discrete Fourier transform i.e., the Fourier series corresponding to a finite number of samples of a waveform. The book, "The Fast Fourier Transform", by E. Oran Brigham includes a good basic treatment of the FFT, including its history.

Although the FFT was initially designed as a computation tool for use in large or medium size computers, it was soon recognized that for high speed requirements special purpose small computers were required whose chief purpose was to calculate the FFT. The evolution of such computers has shown that these machines may be classified principally as follows: (1) pipeline processors, exemplified by the article, "A Pipeline Fast Fourier Transform", by Groginsky and Works, IEEE Transactions on Computers, Vol. C-19, No. 11, November 1970, pp. 1015-1019; (2) parallel-iterative processors, exemplified by the article, "A Fast Fourier Transform Algorithm for a Global, Highly Parallel Processor", by G. Bergland and D. Wilson, IEEE Transactions on Audio and Electroacoustics, Vol. AU-17, No. 2, June, 1969, pp. 125-127 and "The Design of a Class of Fast Fourier Transform Computers" by M. Corinthios, IEEE Transactions on Computers, Vol. C-20, No. 6, June 1971, pp. 617-623.

Pipeline processing is characterized by cascaded stages having a separate arithmetic unit and memory for each stage of the processor. Such an architecture has a speed advantage over a processor which shares a single arithmetic unit and memory. For a radix-2 FFT of N points, there are $\log_2 N$ stages, or iterations, and hence this represents the speed improvement possible by pipelining.

Despite the advantages of pipelining approaches, there are a number of difficulties in constructing extremely high speed and large array size transform processors. These include: (1) the degree of parallelism cannot be increased above $\log_2 N$ without either going to higher decomposition (radix) systems or using multiple parallel interconnected pipelines, (2) in order to keep the total memory requirement of the processor on the order of N words of memory, where N is the number of sample data points, the delays through the various stages of the pipeline are such that at various times data from a given input block of time samples is being processed by several processors; and (3) in order to keep the total memory requirement of the processor small and yet permit real time operation, the processor is usually designed so that the first processing unit contains 2 N words of storage, the next N words, the next N/2 words, etc. The implications of the first problem are clear. The implications of (2) and (3) are that it is difficult to construct an efficient pipelined processor, in terms of memory requirement, with identical processing units from one stage to the next. Generally, the control required, some arithmetic functions, and memory size will vary from one processing unit to the next. For large size pipelines, this creates problems in processor development, test and fault diagnosis, sparing and, hence, cost and reliability. In addition, item (2) increases the internal word size requirement since condition block scaling is prevented.

In the full parallel-iterative processor an entire stage of the FFT algorithm is performed in parallel, i.e., N/2 (radix-2) butterflies are performed in parallel, where a butterfly is the basic standard arithmetic operation in FFT computation. When the stage is complete, the resulting output data becomes the input for the next stage and the same processing unit performs the next iteration. Clearly, then, the increase in speed possible is N/2 over that possible with a processor employing no such parallelism and only one arithmetic unit with comparable speed circuitry. The difficulty with the parallel-iterative processor is the extreme complexity resulting from a degree of parallelism of N/2. A partial parallel-iterative structure reduces this complexity and avoids the problems associated with pipelined processors.

SUMMARY OF THE INVENTION

An object of the invention was to devise a simplified FFT processor for handling a relatively large number of sampled data points in real time. A further object was to devise a processor that would include a type of parallelism that could be gradually increased to achieve a desired processing rate. Another object of the invention was to devise an FFT processor having a construction which is easy to build, diagnose and repair.

The above objects have been achieved in a highly modular FFT processor which for radix-2 implementation utilizes multiple identical processor cards interconnected by two output ports and two input ports arranged in a new way which carries out Singleton's algorithm, see "A Method for Computing the Fast Fourier Transform with Auxiliary Memory and Limited High Speed Storage" by R. C. Singleton in IEEE Transactions on Audio and Electroacoustics, Vol. AU-15, pp. 91-97, June 1967. The structure is a partial parallel-iterative type.

The inventive implementation of Singleton's radix-2 algorithm is carried out as follows: at each stage of the algorithm the current set of N data words is split into m interlaced data sets where m is the degree of parallelism, assumed to be a power of two. Each data set is operated upon by a separate, but identical processor. All m processors perform their computations simultaneously, thus achieving the degree of parallelism m.

The processing within a processor consists of reading two complex words from memory, performing the standard FFT computation function termed a "butterfly", and then transmitting the resulting two complex words to two other processors (one word to each). Simultaneously, each processor is receiving and storing into another portion of memory two complex words that were the outputs of two other processor boards. These are to be used for computations during the next stage of the FFT algorithm.

The memory units within each processor are split into eight submemories. During a given stage of computation half the memories are used to feed data to the butterfly unit within the same processor and the other half are used to receive data from other processor boards. These halves alternate functions from one stage to the next. The other subdivisions permit simultaneous access by the butterfly unit of two complex words and simultaneous reception from other processor boards of two complex words. No words of memory are accessed more than once per stage and an access consists of either a read or write operation, but not both.

For a radix-2 version of Singleton's algorithm, the interconnection between processors is as follows: for i between 1 and m/2, processor i outputs one complex word to processor 2i−1 and one word to processor 2i; for i between m/2+1 and m, processor i outputs one word to processor 2i−1−m and one word to processor 2i−m. This interconnection is fixed for all iterations. During a given stage each processor feeds N/2m pairs of complex words to other processors.

Straightforward variations are possible on the above described structure. By reordering the input data into so-called "bit-reversed" index order (words are placed in order of the bit-reversed binary representation of their original index), another interconnection of processors results which may be described as that just given except that the words "outputs" and "to" are replaced by "inputs" and "from". Equivalently, for i even, processor i outputs one complex word to processor i/2 and one to (m+1)/2 and for i odd, processor i outputs one complex word to processor (i+i)/2 and processor (m+i+1)/2. Both structures can implement the so-called "decimation-in-time" or "decimation-in-frequency" algorithms, the only differences being the order of accessing sinusoidal multipliers for use in the butterfly operation and the butterfly operation itself, see, for example, "Digital Processing of Signals" by B. Gold and C. M. Rader, McGraw-Hill, 1969, pp. 173–196.

Implementation of radix-k algorithms for k greater than 2 may be performed with extensions of the structures for radix 2 if the number of processors m is a power of k, and the number of data samples N is a higher power of k. In this case each processor operates on k complex words at a time to produce k complex output words. Each processor then has k input ports and k output ports. Internal memories are divided into 2k² sections and a k point butterfly operation is performed by each processor together with some additional complex multiplications of data words by weights termed "twiddle factors". For the ordered input case the interconnection between processors is as follows: processor i outputs one complex word to each of k processors with numbers in the range k(i−1)+1 mod m to ki mod m, where mod means modulo. Again, if input data is placed in bit-reversed index order another structure exists with interconnections the same as that mentioned except that the words "outputs" and "to" are replaced by "inputs" and "from".

In addition to the memories and butterfly units each processor contains a storage table, in the form of semiconductor read-only memory, of sinusoidal coefficients to be used as multipliers in the butterfly and "twiddle factor" operations. The same storage table is present in all processors, although different processor boards access different portions of the table. The portion of the table accessed is provided by constant control signals sent to each processor board.

Additional inputs to processor boards include control signals for accessing memory, clock lines for synchronizing performance of logical operations, and control and data lines for for transmitting new data to processor boards from an input-output board prior to performing a transform, and for receiving data from processor boards by the input-output board following a transform. Identical memory access and clock controls are sent to all processor boards, while the input-output control and data lines transmit different information to different boards.

DESCRIPTION OF THE PREFERRED EMBODIMENT

Figure 1:
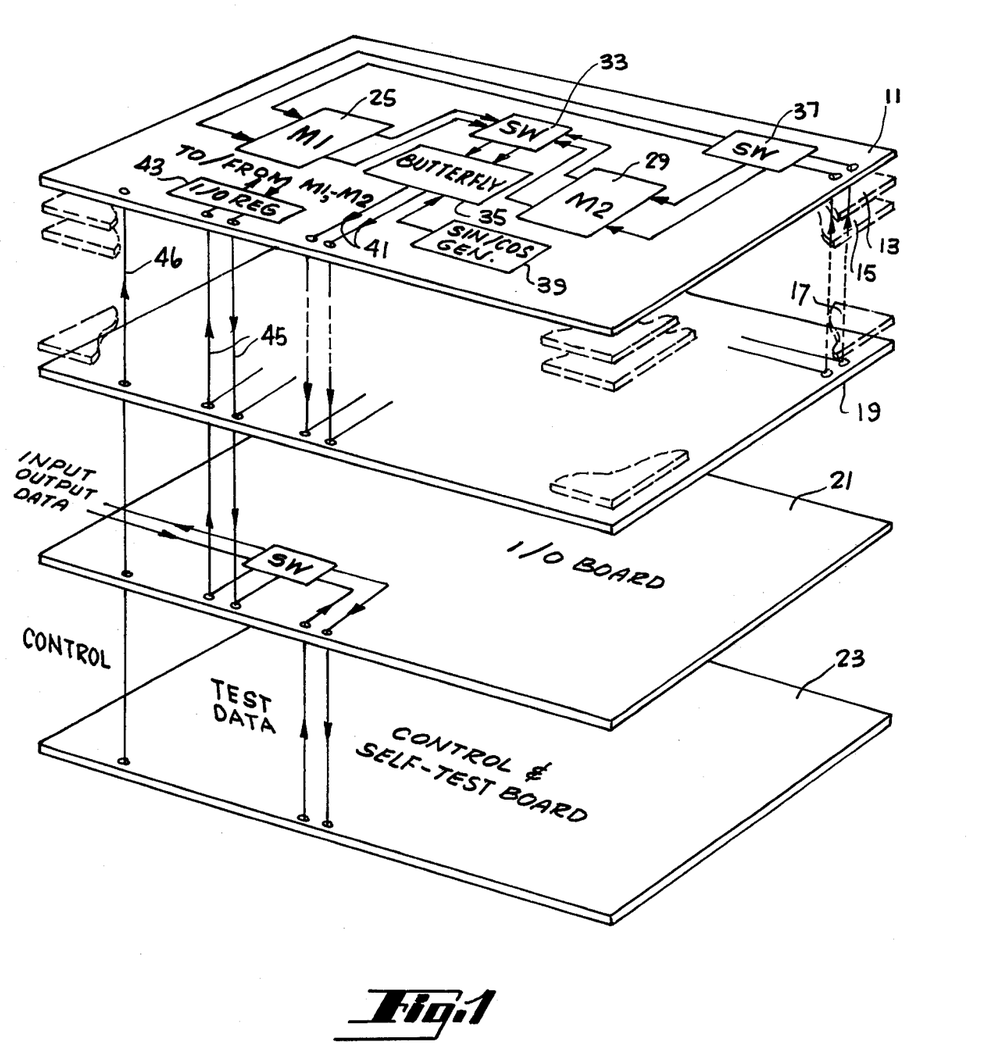
FIG. 1 is a plan view of a FFT parallel processor with multiple identical circuit cards.

Shown in FIG. 1 is a multi-card processor for calculating the fast Fourier transform (FFT). In particular, a series of cards 11, 13, 15, 17, 19 is shown, representative of a number of identical cards, say 32, which constitute the processor. In addition in I/O board 21 and a control and test board 23 complete the processor unit. Each processor card, such as card 11, has memory units 25 and 29 which store input words which are fed to switch 33. During one entire iteration of the FFT one memory unit supplies pairs of complex words to the butterfly unit 35 via the switch 33, while the other receives pairs of complex words from other processor boards via the switch 37. At the end of the iteration the switches change positions and the roles of the two memories reverse for the next iteration. Thus roles alternate from one iteration to the next. Each memory unit is further subdivided into four sections, as described later, to permit parallel access of pairs of complex words.

The memory units 25, 29 are standard semiconductor integrated circuits in the form of random access memories or shift registers. Butterfly 35 is similarly a semiconductor integrated circuit which performs a complex multiplication, and a complex addition and subtraction in a well-known way. To perform the operation, a complex weighting coefficient is supplied by the sine/cosine generator 39 just prior to the time that the butterfly operation is performed.

Output signals from butterfly 35 are taken along the line 41 and fed as inputs to two other boards as described below. Both the butterfly 35 and the sine/cosine generator are available as semiconductor integrated circuits.

An I/O register 43 is used to input data to the memories prior to performing a transform and to output data following a transform. During these operations a direct data path exists between the I/O registers and the memories, that takes precedence over the above-mentioned paths. A data bus 45 is common to similar I/O registers on each board, and transfer of data over this bus is performed in a time-division multiplexed manner. The I/O board 21 controls transfer of data between devices external to the FFT processor and the various processor boards. It may also perform preprocessing functions, such as scaling input data or multiplying such data by a specified set of coefficients. The I/O board also can transfer internally generated test data to processor boards in lieu of normal data.

The number of boards in FIG. 1 depends mainly on the required processing speed of the overall processor. In general, this size will be a power of the radix (2, for the present case) and in the preferred embodiment, 32 boards are required for the example described herein. However, this number is not critical and more or fewer boards could be used. Thirty-two boards would result in a processing speed increase somewhat less than 32 times that for a single board and would permit an increase of transform size by a factor of 32.

In FIG. 1, a control and self-test board 23 is also shown to be connected to the other boards. The control board contains a master clock for providing timing signals, as well as interrupt logic for truncating arithmetic operations after a desired number of iterations, or for other desired purposes which may be programmed into such logic. Optionally, the test board may contain a microprocessor for exercising the system in accord with a set of instructions and for performing diagnostic operations which may designate a malfunction.

Figure 2:
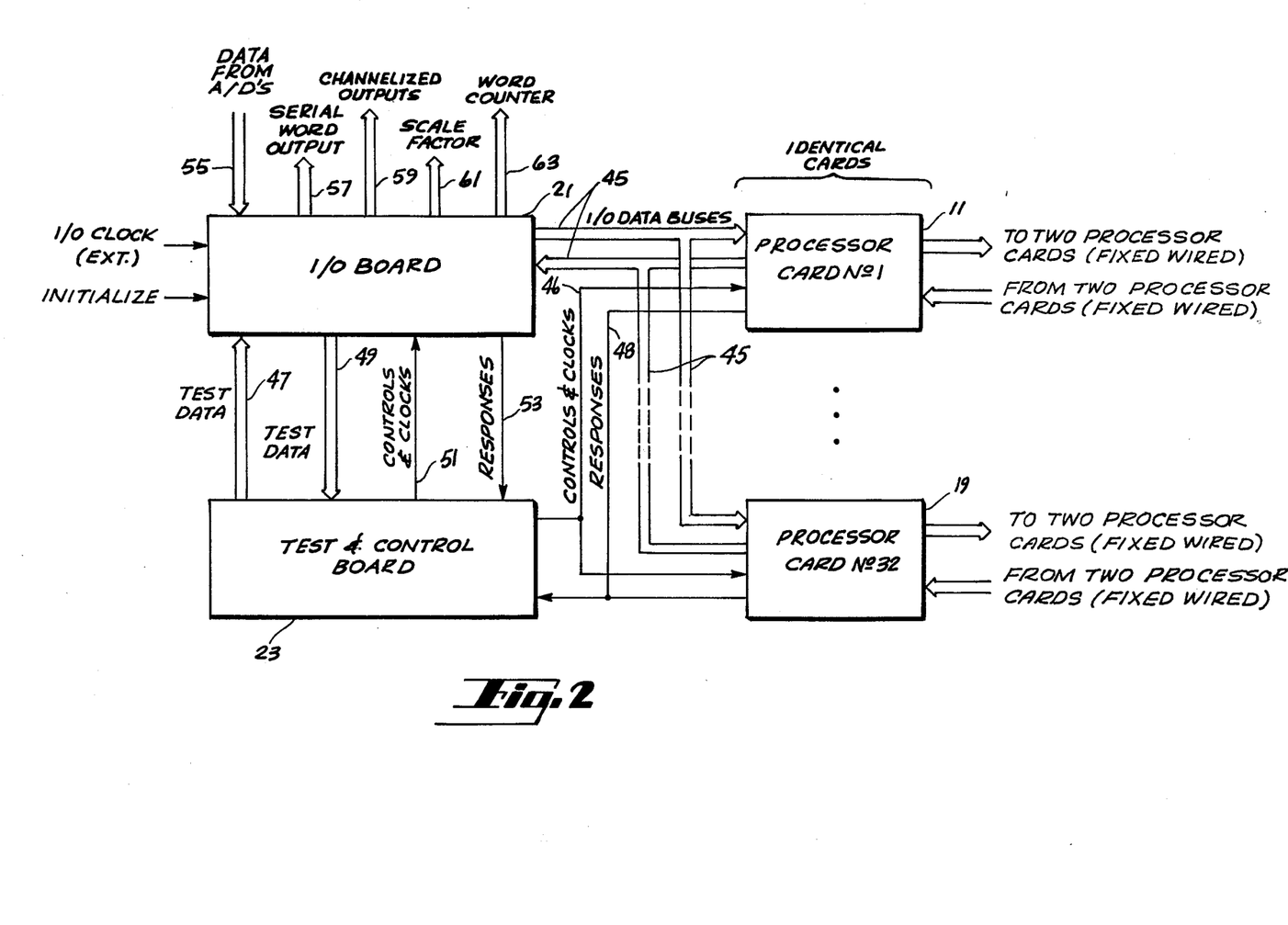
FIG. 2 is an electrical plan for the FFT parallel processor of FIG. 1.

The relationship between the test and control board and the I/O board and the processor cards may be seen in FIG. 2.

With reference to FIG. 2, I/O board 21 and test and control board 23 may be seen connected to exchange words of test data along lines 47, 49. Signals from the master clock are fed from board 23 to board 21 along line 51, while acknowledging responses from the I/O board 21 to the test board 23 are received along line 53.

I/O board 21 receives external data from analog to digital converters, external to the processor, along lines 55 and has a pair of output ports for either serial word outputs taken along line 57 or channelized outputs along lines 59. For block floating point arithmetic, scale factor data is transmitted outwardly along line 61 and data indicating word count is transmitted through line 63.

As previously mentioned, a data bus 45 connects the I/O board with the identical processor cards, illustrated in FIG. 1. Each of the identical processor cards 11-19 also receives control signals along line 46 and sends responses along line 48, with respect to test and control board 23. The output from each board is taken along two paths which are connected to two neighboring boards as explained hereinafter.

Figure 3A:
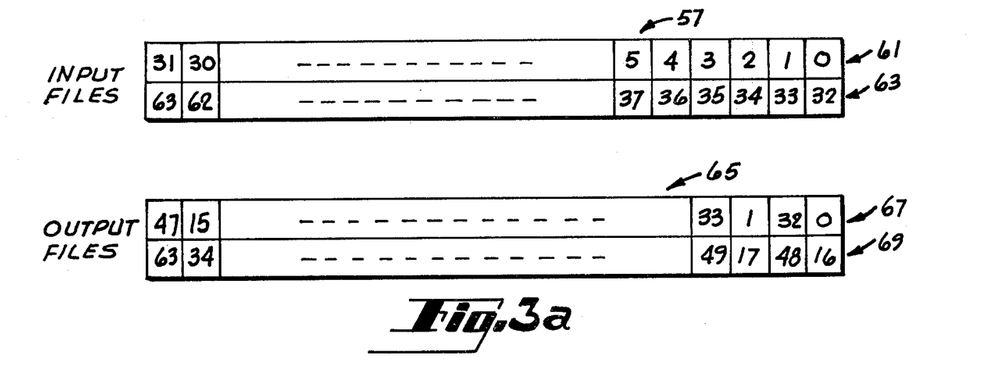
FIGS. 3a and 3b illustrates how data is routed using only a single processor to perform a 64 point transform.
Figure 3B:
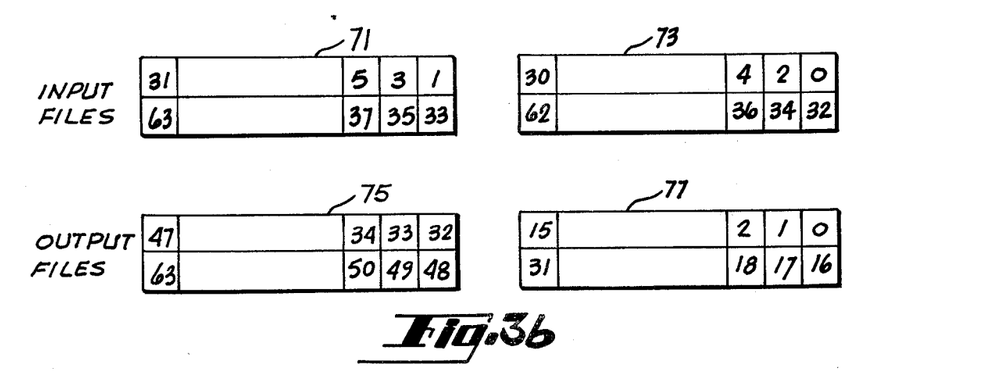
Figure 4:
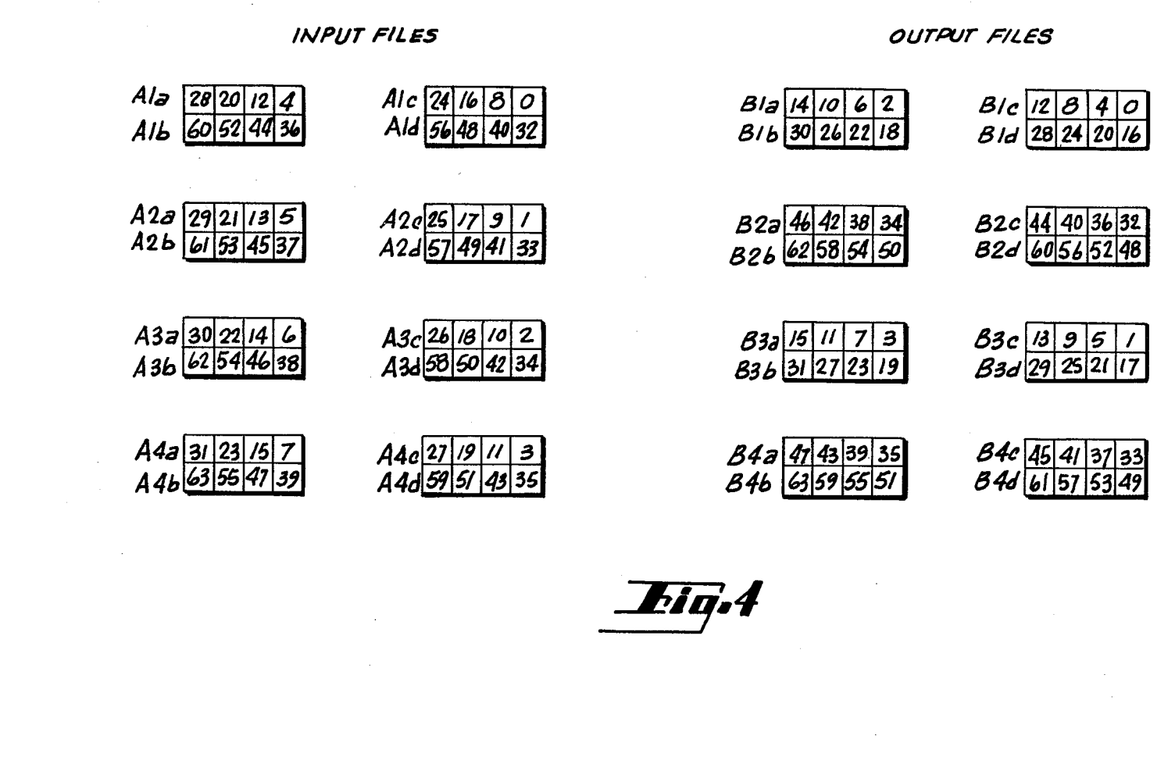
FIG. 4 illustrates an example of data flow for the case of four parallel processors performing a radix-2 64 point transform. The numbers in the memory designation indicate the processor number. For example, A1a belongs to processor number one.

Data is manipulated by the processor of the present invention in accord with Singleton's algorithm. FIGS. 3a, 3b and 4 show a convenient arrangement for input and output files which are organized into the memory units shown in FIG. 1 for each processor card. In FIG. 3a, the input file 57 is shown to have two rows 61, 63 wherein words are stored for transmission to a butterfly. Output is from the right hand side of the input file. After the butterfly is performed words are stored in the output file 65, with words entered from the right hand side in the two levels 67, 69. This same routing is used at each stage of the algorithm. It will be seen that the words 0,32 from input file 57 are stored in the upper level 67 of the output file after the butterfly is performed. Since only one word can be entered at a time, it is advantageous to split the output file into two portions so that the word 0 and the word 32 can be written simultaneously in two output files. The input file must be split similarly since at the next stage the roles of the two files are reversed. In FIG. 3b, the input and output files have been divided as mentioned above. Now, input files 71, 73 have interleaved input data while output files 75, 77 have interleaved output data. In the example mentioned above, the input words "0", "32" may be accessed from the input file 73 and the "0" stored in output file 77, while the word "32" is written in output file 75. In this way, both output words may be written at the same time because they are written in separate memory units.

FIG. 4 shows an even further subdivision of the memory files which is possible if four butterflies are performed in parallel. All files with a common number in their designation can be placed on one circuit board together with a butterfly unit. Four such circuit boards are then required by the subdivision of FIG. 4.

Each of the input files A1a, A1b, A1c and A1d can be regarded to be a separate memory unit which is connected to a butterfly, with one pair of memory units being connected to a butterfly at a time through a switch, such as shown in FIG. 1. For example, the input files A1c and A1d may be connected to a butterfly for input of the words "0" and "32" at one time. One cycle later the input files A1a, A1b are connected to the butterfly for input of the words "4" and "36". In the first instance, the words "0" and "32" are processed by the butterfly and transmitted to output files B1c and B2c, as shown. The input words "4" and "36" are then processed and placed in the next storage location of the same output files, B1c and B2c. While the first butterfly processes words "0" and "32" the second processes "1" and "33", the third processes "2" and "34" and the fourth processes "3" and "35". The resulting data words are sent in parallel to the output files shown in FIG. 4.

Figure 5:
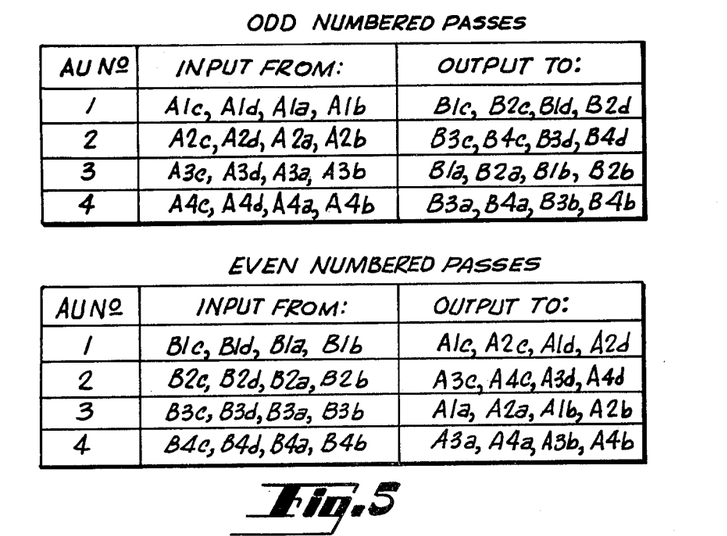
FIG. 5 illustrates an example of an input-output data flow for butterfly units, or arithmetic units (AU), on odd and even numbered passes for the four parallel processor radix-2 case.

The sequence for operation of the files illustrated in FIG. 4 is shown in FIG. 5. On odd-numbered passes, data is taken from files with "A" in their designations, passed through butterflies and transmitted to files with "B" in their designations. On even-numbered passes the roles of these files are reversed. This procedure is repeated until the FFT processing is complete.

Figure 6A:
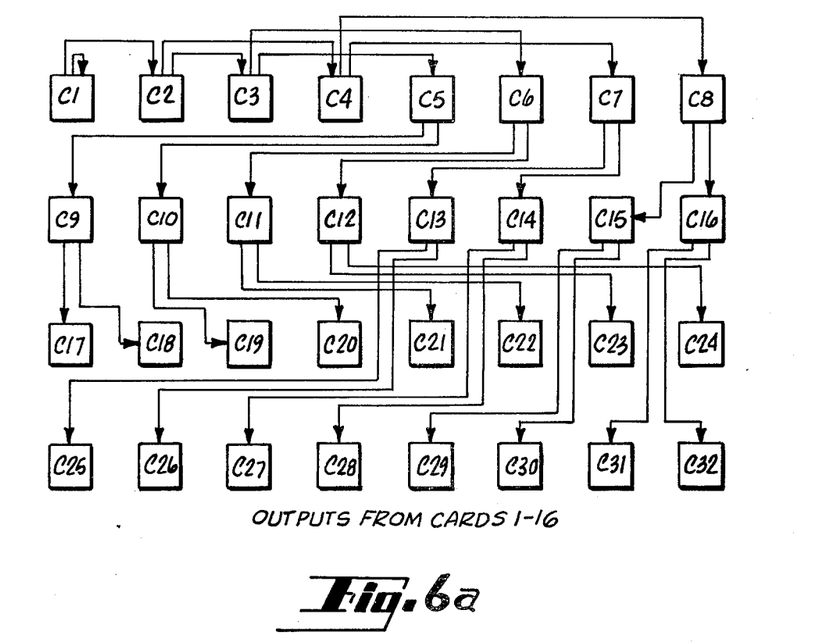
FIGS. 6a and 6b show the electrical data interconnections of the identical circuit cards of FIG. 1 for the case of 32 parallel processors and a radix-2 ordered input transform.
Figure 6B:
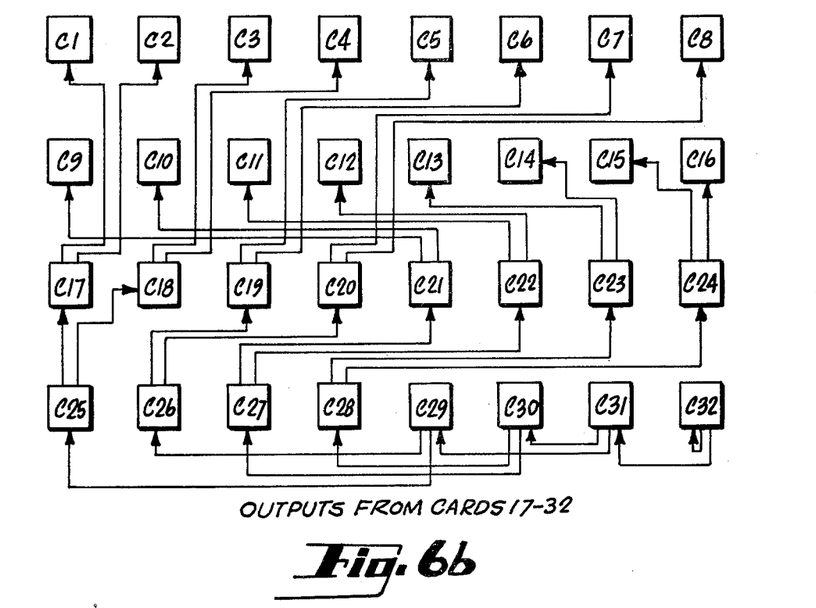

FIGS. 6a and 6b show the interconnection of 32 processor cards. This is the direct extension of FIG. 4. Each processor card contains an input file and an output file, each of which is divided into four subfiles in the manner of FIG. 4. FIGS. 6a and 6b are divided so that the interconnection between boards may be clearly seen. However, to understand the interconnections FIGS. 6a and 6b should be mentally superposed, one atop the other. A geometric regularity may be seen with respect to the interconnections. Processor cards with numbers i in the region 1 to 16 transmit data to cards 2i-1, and 2i and those with numbers between 17 and 32 transmit data to cards 2i-1-32 and 2i-32. This fixed interconnection of cards implements Singleton's algorithm for carrying out all stages of the FFT. The processor design is highly modular, allowing quick replacement of processor cards which become defective.

Figure 7:
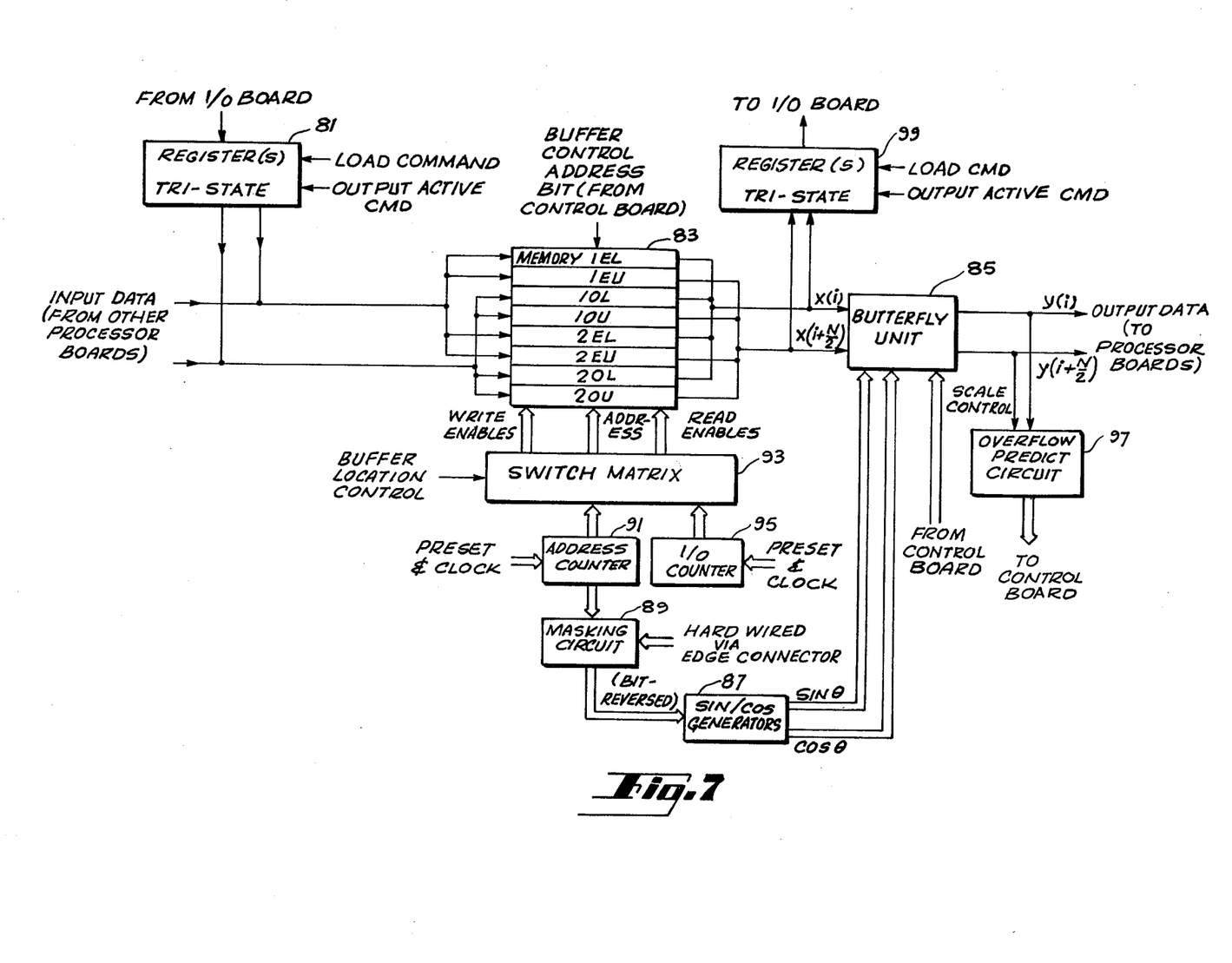
FIG. 7 is an electrical block diagram of one of the multiple identical processor cards of FIG. 1, again for a radix-2 ordered input transform.

FIG. 7 shows a block diagram of a processor card. The memory 83 is divided into eight sections in accordance with the previous discussion of FIG. 4. The files are denoted 1EL, 1OL, etc. The first number specifies whether the file is an input or output file. When "1" is an input file, "2" is an output file, and vice versa. The designation E and O refers to even and odd. This implements the splitting of input files into two files containing even and odd numbered or indexed words, in accordance with FIG. 3b. Finally, the designation U and L refers to upper and lower. This segments data so that two words may be sent simultaneously to the butterfly unit 85. The designation comes from the fact that one word of the pair has index less than N/2 (beginning with index 0) and the other index greater than or equal to N/2, where N is the number of points of the FFT.

In normal operation, let 1 be the input file and 2 the output file. Then 1 transmits words to the butterfly unit of FIG. 7 by alternately supplying pairs of words first from memory segments 1EL and 1EU and then on the next clock cycle from 1OL and 1OU. Words within a given memory segment are accessed in a normal sequential manner. Simultaneously, memory segments 2 are receiving data from other processor boards following performance of butterfly operations on these boards. Data is stored in these segments by placing pairs of data words in segments 2EL and 2OL for N/2 clock cycles until these memories are completely filled. Within each segment memory words are accessed in normal order. Next, memory segments 2EU and 2OU receive pairs of data words until these memories are filled. A transform stage, or iteration, is them complete and the roles of memories 1 and 2 are reversed.

Addressing of memory and read/write commands may be derived directly from an address counter 91 via some logic, termed a "switch matrix" 93 in FIG. 7. As seen in this figure, the processor boards contain sine/cosine generators 87 in the form of semiconductor read-only memory look-up tables. These tables are also addressed by signals derived from the same address counter 91. As the transform proceeds from one stage to the next the number of different words addressed in this memory doubles. The masking circuit 89 of FIG. 7 following the address counter 91 uncovers one additional bit per iteration from the address counter, thus implementing the required number of words to be accessed. The butterfly unit 85 multiplies one of its complex inputs by the complex exponential supplied by the sine/cosine generator 87, and then forms two complex words by adding and subtracting the result from the second complex word fed to the butterfly. Overflow predict circuit 97 determines the magnitude of output words and scales data by one bit following the butterflies of the next iteration if any word has magnitude exceeding one-half full scale.

The remaining circuitry in FIG. 7 comprises two sets of registers 81 and 99, one receiving data from the I/O board and one transmitting data to that board, and an I/O counter 95. These registers are to be used to initially load data into the memories prior to performance of a transform and to transfer data out of the processor boards to the I/O board following the completion of a transform. Such flow of data can occur in place of normal flow of data between processor boards (during performance of transforms), or it can occur during performance of a transform of previously entered data. In the latter case transfer of data between the I/O board and memories occurs on a cycle stealing basis, that is, normal flow of data between processor boards is interrupted for one cycle in order to permit the transfer of one word to memory from the I/O board and one word to the I/O board from memory. In such cases the memories must be further partitioned into two halves—one half being used in the performance of a transform and the other half used as a buffer for transfer of data between the I/O board and memory. Such buffering permits a doubling of the speed of operation of the processor at the expense of halving the transform size. In addition, such buffering permits continuous computation of transforms of adjacent blocks of data with no gaps of time between such computations. Addressing for transfer of data between the memories and the I/O board is facilitated by a separate I/O counter resident on the processor boards and read/write commands sent to thse boards from the control board.

As indicated previously, variations exist on the basic structure described above. The interconnections of processor boards in such variations has been described previously. Alterations in the processor boards are straightforward. If data is initially provided in bit-reversed index order, then the main change to the structure of FIG. 7 is that the interconnection of signal lines at the memory inputs is similar to that of the memory outputs of FIG. 7. A similar role reversal occurs for interconnection of memory output lines. Performance of decimation-in-time versus decimation-in-frequency algorithms is determined by the structure of the butterfly unit and the sequence of accessing sinusoids from the sine/cosine generators. Finally, the extension to higher radix systems requires the use of butterfly units with a number of inputs and outputs equal to the radix, and processor memories are segmented into a number of sections equal to twice the square of the radix.

What is claimed is:

1. In a fast Fourier transform processor of the radix 2 type, utilizing memory units and butterfly units, the construction comprising,
    (i) a plurality of identical circuit cards, each card having electrical apparatus for performing operations required by the fast Fourier transform including,
        (a) two input ports, a first switching means and first and second memory units connected together for feeding two complex input words one derived from each of two connected circuit cards into said input ports and thence to said switching means and to one of said first and second memory units mounted on each card,
        (b) a second switching means and a butterfly unit having inputs and outputs, the inputs connected to the second switching means which is in turn connected to the first and second memory units, said first switching means for connecting said input ports first to one of said first and second memory units then the other, from one iteration of the fast Fourier transform to the next, said second switching means connecting the one of said first and second memory units, which is not connected to the input ports, to the butterfly unit, (c) two output ports, each connecting the outputs of said butterfly to one of two cards for feeding one of two complex output words from said butterfly through a first switching means, to a memory unit mounted on each of said one of two cards, and (ii) a control card having control circuit means connected to said butterfly and memory units of all of said identical circuit cards for controlling fast Fourier transform iterations by said circuit cards.

2. The apparatus of claim 1 wherein said identical circuit cards are M in number, where M is a power of two, and i is a number from 1 to M with one output port of the ith card being connected to an input port of card $2i-1$ and the other output port being connected to an input port of card $2i$, if i is less than or equal to M/2; but with one output port of said ith card being connected to an input port of card $2i-1-M$ and the other output port of said ith card being connected to an input port of card $2i-M$ if i is greater than M/2.

3. The processor construction of claim 1 wherein each of said memory units is a semiconductor memory storing a stack of words, each of which is a complex word.

4. The processor construction of claim 1 wherein both of said first and second memory units are grouped into 8 interleaved files that subdivide indexed complex words in accordance with whether their index is even or odd, whether their index is above or below half the maximum index, and whether the word is being written into or read from memories.

5. The processor construction of claim 1 further defined by an input-output means connected to a plurality of registers one on each of said cards, each in turn connected to each of said memory units on a respective card for exchanging complex words representing data samples with outside data sources.

6. The processor of claim 5 wherein said identical circuit cards are M in number, where M is a power of two, and the input-output means is connected to receive an input data set to be transformed having N points, where N is a larger power of two than M, said control circuit means having the characteristic that prior to performance of a transform for each integer i from 1 to M, one of the memory units on circuit card number i is loaded in consecutive order with input data words $i+mM$, where m is the sequence of integers $0, 1, 2, \ldots, N/M-1$.

7. The processor of claim 6 wherein during a given iteration of the fast Fourier transform each circuit card butterfly is arranged to operate on pairs of complex words transmitted from memory unit locations k and $k+N/(2M)$, where k is the sequence of integers $1, 2, \ldots, N/(2M)$, within the first memory unit on each card in the first iteration, the second memory unit in the second iteration, and alternating between these two units thereafter.

8. The processor construction of claim 1 wherein a sine and cosine generator is present on each card and is connected to a corresponding butterfly unit on the same card.

9. The apparatus of claim 1 wherein said identical circuit cards are M in number, where M is a power of two, and i is a number between 1 and M with one input port of the ith card being connected to an output port of card $2i-1$ and the other input port being connected to an output port of card $2i$, if i is less than or equal to M/2; but with one input port of said ith card being connected to an output port of card $2i-1-M$ and the other input port of said ith card being connected to an output port of card $2i-M$ if i is greater than M/2.

10. In a fast Fourier transform processor of the radix k type, where k is a number greater than 2, utilizing memory units and butterfly units, the construction comprising, (i) a plurality of m identical circuit cards, where m is a power of k, each card having electrical apparatus for performing operations required by the fast Fourier transform, on a sample of N discrete data points, where N is a greater power of k than m, said cards including, (a) k input ports, a first switching means and first and second memory units connected together for feeding k complex input words, one derived from each of k connected circuit cards, into said input ports and thence to said switching means and to one of said first and second memory units mounted on each card, (b) a second switching means and a butterfly unit having inputs and outputs, the inputs connected to the second switching means which is in turn connected to the first and second memory units, said first switching means for connecting said input ports first to one of said first and second memory units then the other from one iteration of the fast Fourier transform to the next, said second switching means connecting the one of said first and second memory units, which is not connected to the input ports, to the butterfly unit, (c) k output ports, each connected said butterfly to k cards for feeding one of k complex output words from said butterfly through a first switching means to a memory unit mounted on one of said k cards, an output of the ith card being connected to an input port of each of said k cards in the interval $k(i-1)+1 \bmod m$ to $ki \bmod m$, where i is a number between 1 and m, and (ii) a control card having control circuit means connected to said butterfly and memory units of all of said cards for controlling fast Fourier transform iterations by said circuit cards.

11. The processor construction of claim 10 wherein each of said memory units is a semiconductor memory storing a stack of words, each of which is a complex word.

12. The processor construction of claim 10 wherein said memory units are grouped into $2k^2$ interleaved files.

13. The processor construction of claim 10 further defined by an input-output means connected to a plurality of registers one on each of said cards, each in turn connected to each of said memory units on a respective card for exchanging complex words representing data samples with outside data sources.

14. The processor construction of claim 10 wherein a sine and cosine generator is present on each card and is connected to a corresponding butterfly unit on the same card.

15. In a fast Fourier transform processor of the radix k type, where k is a number greater than 2, utilizing memory units and butterfly units, the construction comprising, (i) a plurality of m identical circuit cards, where m is a power of k, each card having electrical apparatus for performing operations required by the fast Fourier transform, on a sample of N discrete data points, where N is a greater power of k than m, said cards including, (a) k input ports, a first switching means and first and second memory units connected together for feeding k complex input words, one derived from each of k connected circuit cards, to said input ports and thence to said switching means and to one of said first and second memory units mounted on each card, (b) a second switching means and a butterfly unit having inputs and outputs, the inputs connected to the second switching means which is in turn connected to the first and second memory units, said first switching means for connecting said input ports first to one of said first and second memory units then the other from one iteration of the fast Fourier transform to the next, said second switching means connecting the one of said first and second memory units, which is not connected to the input ports, to the butterfly unit, (c) k output ports, each connecting said butterfly to k cards for feeding one of k complex output words from said butterfly through a first switching means from a memory unit mounted on one of said k cards, an output of the ith card being connected to an output port of each of said k cards in the interval $k(i-1)+1 \mod m$ to $ki \mod m$, where i is a number between 1 and m, and (ii) a control card having control circuit means connected to said butterfly and memory units of all of said cards for controlling fast Fourier transform iterations by said circuit cards.

16. The processor construction of claim 15 wherein each of said memory units is a semiconductor memory storing a stack of words, each of which is a complex word.

17. The processor construction of claim 15 wherein said memory units are grouped into $2k^2$ interleaved files.

18. The processor construction of claim 15 further defined by an input-output means connected to a plurality of registers one on each of said cards, each in turn connected to each of said memory units on a respective card for exchanging complex words representing data samples with outside data sources.

19. The processor construction of claim 15 wherein a sine and cosine generator is present on each card and is connected to a corresponding butterfly unit on the same card.

* * * * *

UNITED STATES PATENT AND TRADEMARK OFFICE
CERTIFICATE OF CORRECTION

PATENT NO. : 4,241,411

DATED : December 23, 1980

INVENTOR(S) : Norman F. Krasner and Barry M. Leiner

It is certified that error appears in the above-identified patent and that said Letters Patent are hereby corrected as shown below:

Col. 4, line 46
"In addition in I/O board 21" should read
--In addition an I/O board 21--

Col. 7, line 38
"is them complete" should read
--is then complete--

Col. 8, line 3
"performane" should read
--performance--

Col. 8, line 23
"thse" should read
--these--

Claims:

Claim 10 (c) "k output ports, each connected" should read
--k output ports, each connecting--

Signed and Sealed this

Fifth Day of May 1981

[SEAL]

Attest:

RENE D. TEGTMEYER

*Attesting Officer*    *Acting Commissioner of Patents and Trademarks*